United States Patent [19]
Sakashita

[11] Patent Number: 5,856,735
[45] Date of Patent: Jan. 5, 1999

[54] RECORDING AND REPRODUCTION APPARATUS

[75] Inventor: Mitsunori Sakashita, Miyagi-ken, Japan

[73] Assignee: Alps Electric Co., Ltd., Tokyo, Japan

[21] Appl. No.: 974,066

[22] Filed: Nov. 19, 1997

[51] Int. Cl.[6] .................................................... H02P 8/00
[52] U.S. Cl. .......................... 318/696; 318/685; 318/569; 318/600; 318/254; 328/138; 328/439
[58] Field of Search .................................. 318/696, 685, 318/569, 600, 254, 138, 439

[56] References Cited

U.S. PATENT DOCUMENTS 5,359,271 10/1994 Husher ...................................... 318/696
5,659,234 8/1997 Cresens ...................................... 318/696

FOREIGN PATENT DOCUMENTS

07272291 A 10/1995 Japan .

*Primary Examiner*—Karen Masih
*Attorney, Agent, or Firm*—Brinks Hofer Gilson & Lione

[57] ABSTRACT

A riving current supply device for driving a stepping motor in micro steps supplies a driving current to the stepping motor for a predetermined time for each micro step, and after an elapse of this predetermined time, the driving circuit supplies a current which is smaller than the driving current and which generates a torque larger than the detent torque of the stepping motor.

4 Claims, 4 Drawing Sheets

RECORDING AND REPRODUCTION APPARATUS

BACKGROUND OF THE INVENTION

1. Field of the Invention

The present invention relates to a recording and reproduction apparatus. More particularly, the present invention relates to a recording and reproduction apparatus in which the average driving power of a stepping motor for moving an optical head in a recording and reproduction apparatus, such as an optical disk apparatus, is reduced and in which an occurrence of what is commonly called track jumping caused by vibrations when the stepping motor is rotationally driven is prevented.

2. Description of the Related Art

In a recording and reproduction apparatus, such as an optical disk apparatus, generally a stepping motor is used as a driving source for moving an optical head for recording or reproduction (hereinafter referred to simply as a head) in the radial direction of a disk and for stopping it at a position near a target track so as to perform what is commonly called microstep driving. Hereinafter, a conventional recording and reproduction apparatus will be described with reference to FIGS. 5 to 8 using an example of an optical disk apparatus.

FIG. 5 is a block diagram illustrating the essential portion of an optical disk apparatus. FIG. 6 shows a current control signal for controlling the driving current of a stepping motor. FIGS. 7 and 8 show the driving current of the stepping motor. As shown in FIG. 5, the optical disk apparatus is provided with an optical disk 2 which rotates by a spindle motor 1, a head 4 which causes an optical beam to track the tracks of the optical disk 2 by the movement of a lens 3 or the like, and a track servo section 5 which performs tracking servo of the head 4 in accordance with a track error signal TES indicating the track position deviation of the head 4. This track servo section 5 generates a tracking servo signal TSV in accordance with the track error signal TES and a control signal from a control circuit 6 in order to servo control the head 4.

On the optical disk 2, signals are recorded on tracks formed in a spiral shape from the inner region of the disk to the outer region, and an optical beam is radiated onto these tracks. The movable range of the optical beam radiated onto the optical disk 2 in the track direction is several tens of tracks by only the head 4 and tracking servo control, and it is impossible to access the entire surface of the optical disk 2. For this reason, driving means for moving and positioning the head 4 in place is provided to move and position (referred to as coarse movement) the head 4 near a target track. As this driving means, a stepping motor 7 which is efficient and can be controlled by an open loop is generally used. The head 4 moves across the tracks in the radial direction of the optical disk 2 which is rotated by the spindle motor 1 by this stepping motor 7. This movement is controlled in response to the rotational control of the stepping motor 7 as a result of the engagement of the needles (not shown) of the head 4 with the lead screw (not shown) formed on the rotation shaft of the stepping motor 7.

The stepping motor 7 is driven by driving currents Ca and Cb from a driving circuit 8 which is driving current supply means. This driving circuit 8 generates the driving currents Ca and Cb in the stepping motor 7 in accordance with current control signals Sa and Sb from the control circuit 6 and polarity switching signals Pa and Pb for controlling the switching of the polarity of the driving current. Here, the stepping motor 7 is what is commonly called microstep-driven. Since the rotation torque must always be constant, the driving currents Ca and Cb are driven by a current which varies in a Sin or Cos fashion: Hereinafter, a case in which a stepping motor of two-phase (A phase and B phase) driving is driven at 1 step angle in 4 micro steps will be described with reference to FIGS. 6 to 8.

The current control signals Sa and Sb, such as those shown in FIG. 6, whose levels increase or decrease in a stepwise manner for each micro step and which vary in a Sin or Cos fashion as a whole, are supplied from the control circuit 6 to the driving circuit 8 in order to microstep-drive the stepping motor 7. Here, Sa is the current control signal of A phase, and Sb is the current control signal of B phase. Further, the current control signals Sa and Sb are shown until the rotational angle of the stepping motor 7 is 180°, but over 180° the signals repeat. Meanwhile, the control circuit 6 supplies the polarity switching signals Pa and Pb for switching the polarity of the driving current to the driving circuit 8 according to the rotational angle of the stepping motor 7. For example, the polarity switching signal Pa of A phase controls the driving circuit 8 so that a driving current in a positive (+) direction flows from 0° to 180°, and a driving current in a negative (−) direction flows from 180° to 360°. The polarity switching signal Pb of B phase controls the driving circuit 8 so that a driving current in a positive (+) direction flows from 0° to 90°, a driving current in a negative (−) direction flows from 90° to 270°, and a driving current in a positive (+) direction flows again from 270° to 360°. These current control signals Sa and Sb and polarity switching signals Pa and Pb are generated by a digital circuit (not shown) within the control circuit 6, and the rise and fall of the signal waveform are sharp.

FIG. 7 shows the waveform of the driving current supplied from the driving circuit 8 to the stepping motor 7 up to one rotation (360°). Ca is the driving current of A phase, and Cb is the driving current of B phase. As can be seen in FIG. 7, the driving currents Ca and Cb flow in a positive (+) direction or in a negative (−) direction. This is due to the polarity switching signals Pa and Pb from the control circuit 6. Except for this, the signals are analogous to the current control signals Sa and Sb of FIG. 6, and are in a Sin or Cos fashion as a whole. The magnitude C (see FIG. 7) of the driving current supplied in an interval T of each micro step corresponds to the level S of the current control signal of FIG. 6. The reason why the signals become analogous is that the inductance of the excitation coil of the stepping motor 7 is very small. Therefore, the sum (total current) of the driving current supplied from the driving circuit 8 to the stepping motor 7 is that shown in FIG. 8, and an electric current of more than a maximum value (electric-current reading 1.0 in FIG. 7) of the driving current which is made to flow to one phase always flows.

As described above, the stepping motor 7 is highly efficient and can be driven by open-loop control, which is advantageous in constructing the apparatus. However, during coarse movement, since the head 4 must be moved near to a target track in as short a time as possible, the stepping motor 7 is always microstep-driven with a large current, having the drawback of causing an increase in the consumption of power. Further, the driving circuit 8 requires a switching element and the like which withstands a large current, resulting in an increase in the cost of the apparatus. Furthermore, a heat sink is required due to the heat generation in the stepping motor 7 and the driving circuit 8, hindering a reduction in the size of the apparatus and causing an increase in the cost.

Because of coarse movement, when the driving current is shut off to stop the head 4 at the place where it reaches a predetermined position, the rotation shaft of the stepping motor 7 is pressingly returned to the detent neutral point by the detent torque which is characteristic of microstep driving. Vibrations which occur at this time are transmitted to the head 4, the lens 3 and the like within the head 4 fluctuates, causing what is commonly called track jumping and the light spot deviates from the track. If this deviation is large, the problem arises that the data error rate increases, and tracking servo is interrupted; making servo impossible.

Further, the waveforms of the driving currents Ca and Cb for rotating the stepping motor 7 are analogous to the waveforms of the current control signals Sa and Sb. These current control signals Sa and Sb are generated by a digital circuit (not shown) of the control circuit 6, and the rise and fall of the waveform are sharp. For this reason, the waveforms of the driving currents Ca and Cb have sharp rise and fall, and a large acceleration is applied to the head 4 during coarse movement, causing the lens 3 and the like within the head 4 to vibrate and similar track jumping occurs.

SUMMARY OF THE INVENTION

Accordingly, it is an object of the present invention to provide a recording and reproduction apparatus in which the consumption of power of the stepping motor 7 which is a driving source for the head 4 is reduced and in which vibrations applied to the head 4 are reduced and track jumping does not occur during coarse movement and recording and reproduction.

To solve the above-described problems, the recording and reproduction apparatus of the present invention comprises: a stepping motor for moving a head in a radial direction of a disk, and driving current supply means for supplying a driving current for driving the stepping motor in micro steps, wherein the driving current supply means supplies the driving current to the stepping motor for a predetermined time for each micro step, and supplies an electric current which is smaller than the driving current and which generates a torque larger than a detent torque of the stepping motor after an elapse of the predetermined time.

Further, in the recording and reproduction apparatus of the present invention, the predetermined time is from 3 to 5 milliseconds.

Further, in the recording and reproduction apparatus of the present invention, a control circuit for supplying a current control signal for controlling the driving current to the driving current supply means is provided so as to supply the current control signal to the driving current supply means via a low-pass filter.

Furthermore, in the recording and reproduction apparatus of the present invention, the low-pass filter comprises an integration circuit formed of a resistor and a capacitor, and the time constant of the integration circuit is set at approximately one fifth of the predetermined time.

The above and further objects, aspects and novel features of the invention will become more apparent from the following detailed description when read in connection with the accompanying drawings.

DESCRIPTION OF THE PREFERRED EMBODIMENT

Figure 1:
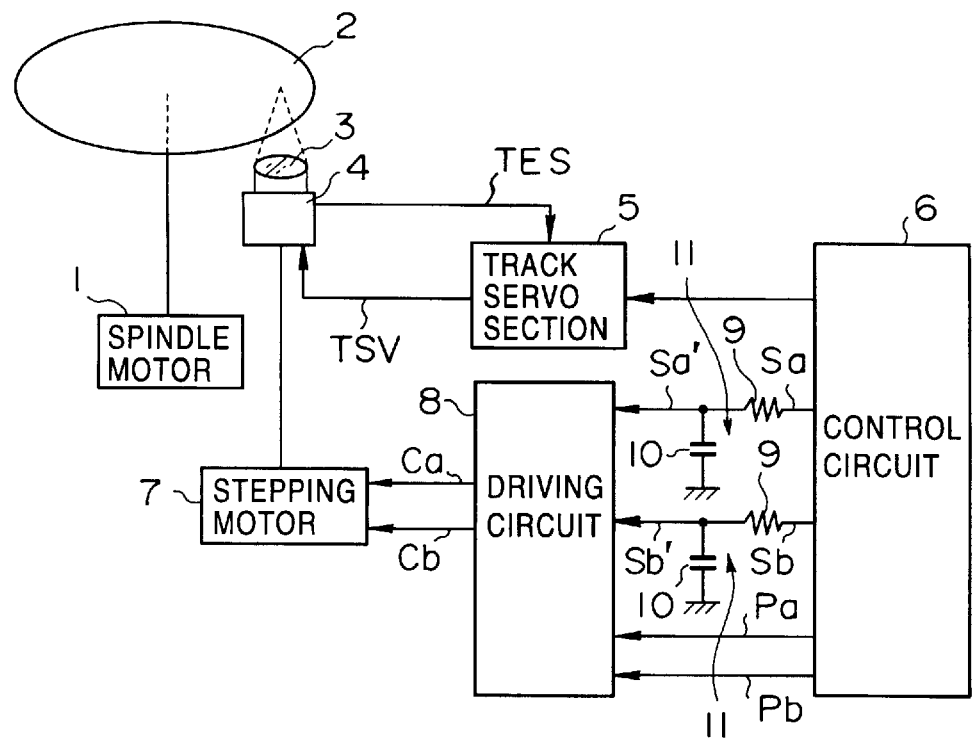
FIG. 1 is a block diagram of a recording and reproduction apparatus of the present invention.
Figure 2:
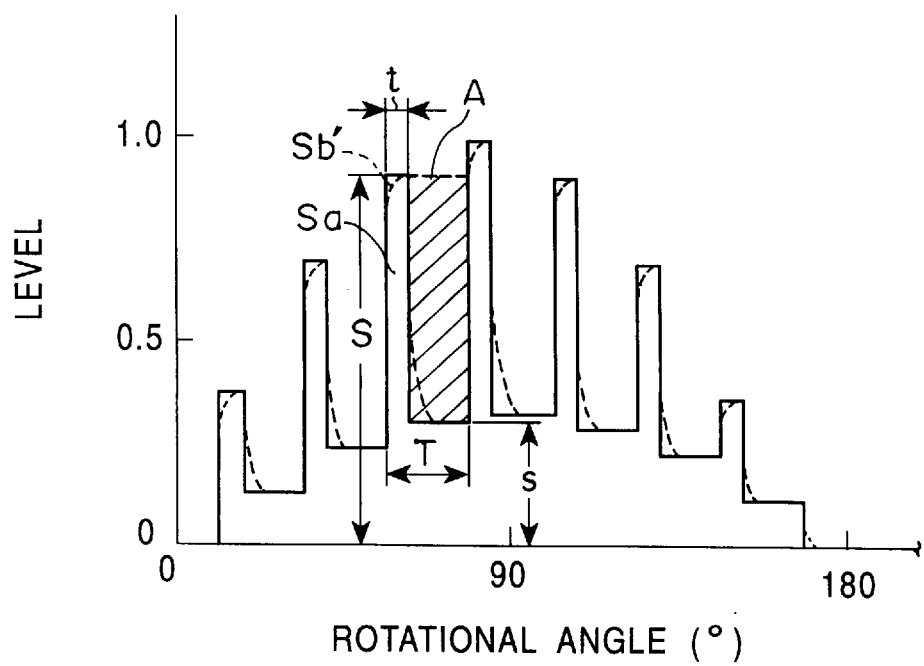
FIG. 2 shows a current control signal in the recording and reproduction apparatus of the present invention.
Figure 3:
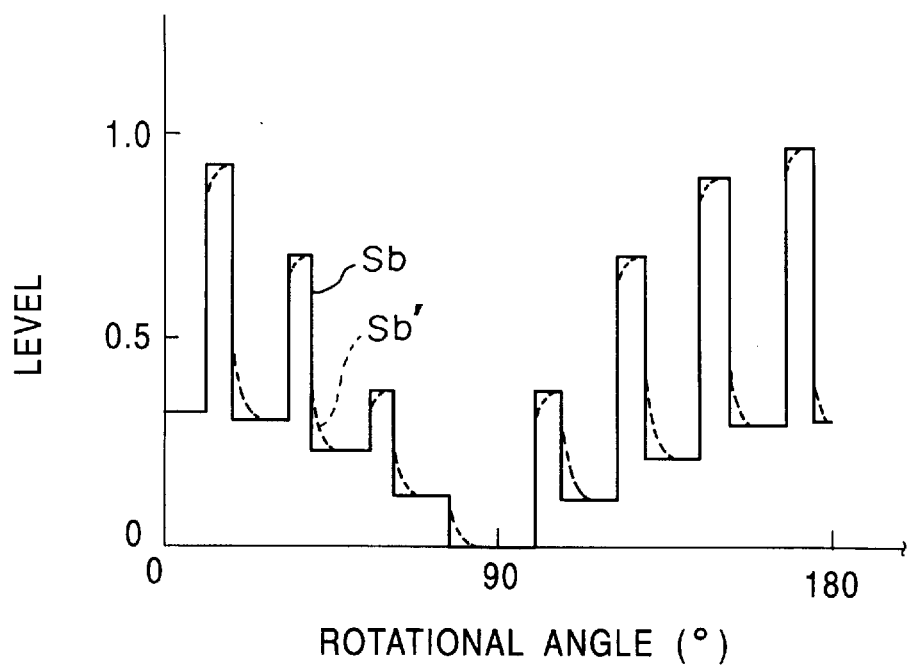
FIG. 3 shows a current control signal in the recording and reproduction apparatus of the present invention.
Figure 4:
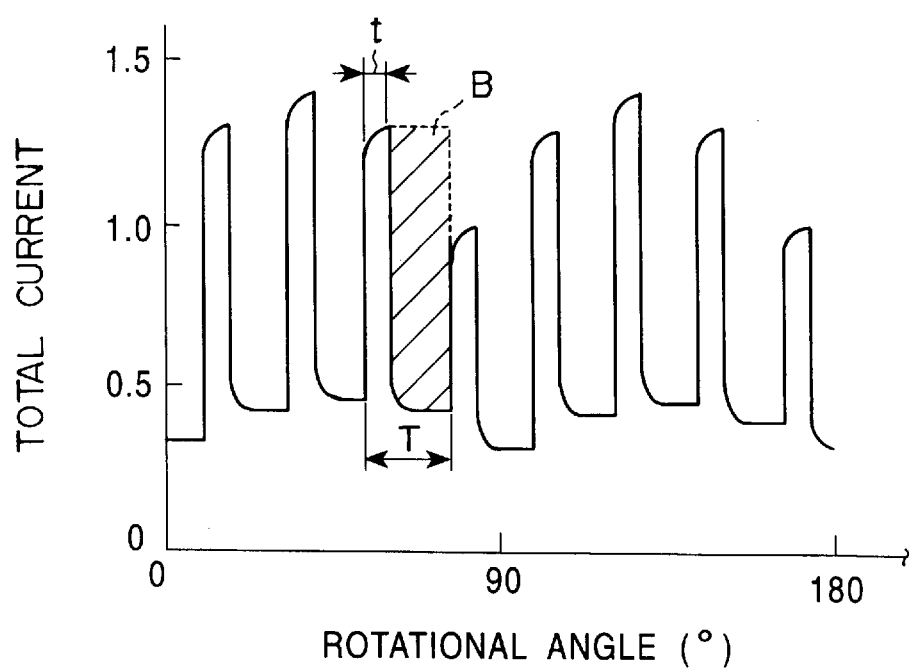
FIG. 4 shows a driving current in the recording and reproduction apparatus of the present invention.

An embodiment of a recording and reproduction apparatus of the present invention will be described with reference to FIGS. 1 to 4. FIG. 1 is a block diagram of the essential portion of a recording apparatus of the present invention. FIGS. 2 and 3 show a current control signal in the recording and reproduction apparatus of the present invention. FIG. 4 shows the total current of a driving current supplied to a stepping motor. The same components in FIG. 1 as those of the prior art are given the same reference numerals and therefore, a description thereof has been omitted.

Figure 5:
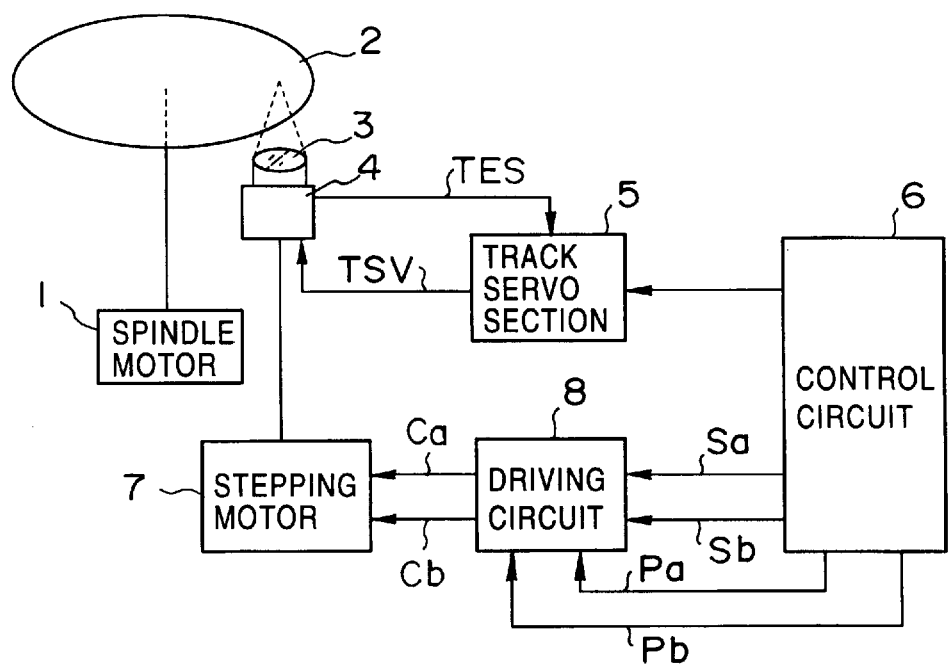
FIG. 5 is a block diagram of a conventional recording and reproduction apparatus.
Figure 6:
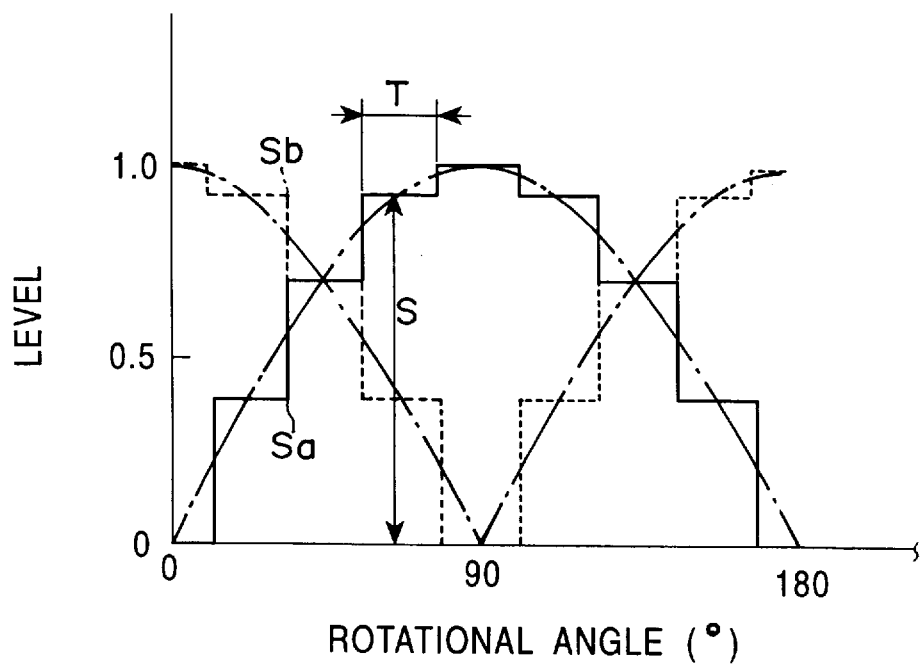
FIG. 6 shows a current control signal in the conventional recording and reproduction apparatus.
Figure 7:
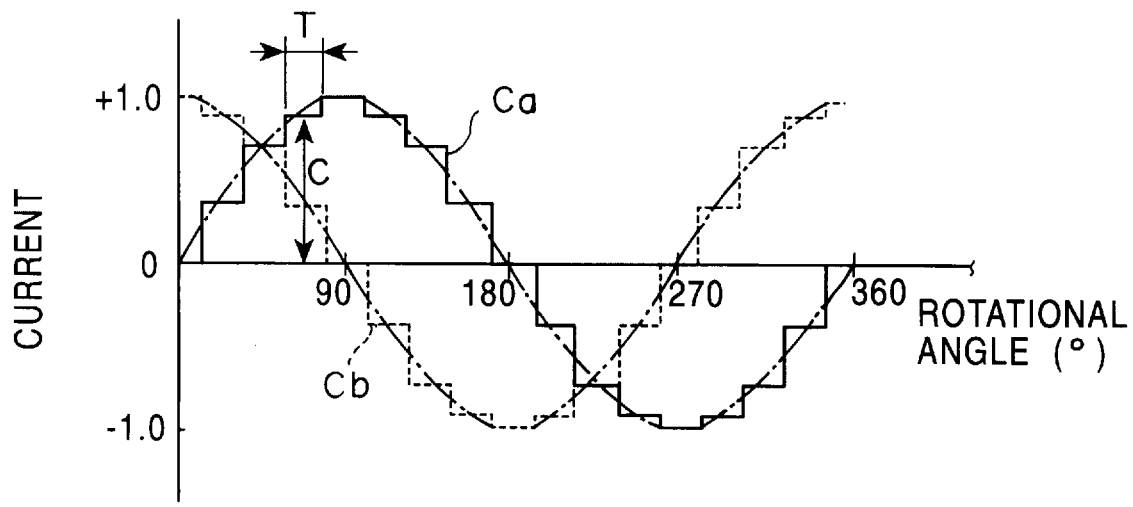
FIG. 7 shows a driving current in the conventional recording and reproduction apparatus.
Figure 8:
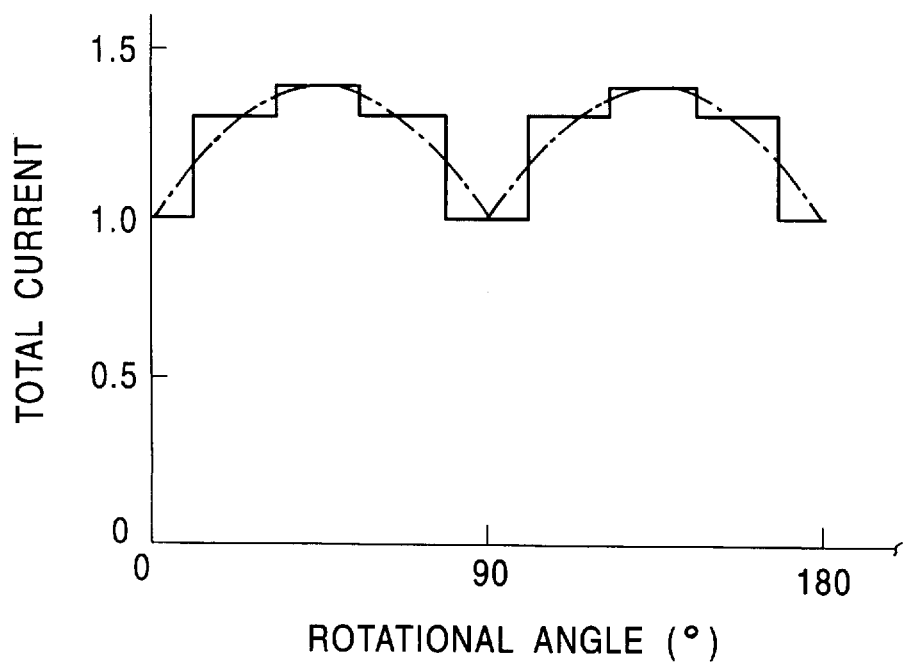
FIG. 8 shows the total driving current in the conventional recording and reproduction apparatus.

In the recording and reproduction apparatus of the present invention, servo control by a track servo section 5 is the same as that of the prior art shown in FIG. 5, but, current control signals Sa and Sb supplied to a driving circuit 8 which is a driving current supply means from a control circuit 6 are different. More specifically, the current control signals Sa and Sb output from the control circuit 6 reach a predetermined level S for only a predetermined time t which is shorter than one micro step interval T and reach a level s lower than the level S after an elapse of time t, as indicated by the solid lines of FIGS. 2 and 3. Therefore, in one micro step, in comparison with the prior art, a signal that omits the portion A indicated by the shading in FIG. 2 is formed (described only in FIG. 2). These current control signals Sa and Sb are supplied to the driving circuit 8 via an integration circuits 11 which is a low-pass filter formed of a resistor 9 and a capacitor 10, as shown in FIG. 1. Therefore, the current control signals Sa and Sb output from the control circuit 6 are waveforms whose rise and fall are sharp as indicated by the solid lines in FIGS. 2 and 3. Current control signals Sa' and Sb' input to the driving circuit 8 are made to have an inclination at the rise and fall as indicated by the dotted line as a result of passing through the integration circuit 11. The waveforms of these current control signals Sa' (A phase) and Sb' (B phase) become those of FIGS. 2 and 3, respectively. For this reason, although not shown, the driving currents Ca and Cb controlled by these current control signals Sa' and Sb' also become analogous to the current control signals Sa' and Sb' and have similar waveforms. Therefore, the current control signals Sa' and Sb' in FIGS. 2 and 3 may be replaced with the driving currents Ca and Cb, and the levels S and s of the current control signals Sa and Sb may be replaced with the levels (magnitudes) C and c of the driving currents Ca and Cb. Since the driving currents Ca and Cb are supplied for only a predetermined time t of one micro step interval T, the total current becomes as shown in FIG. 4, and the current reduces by the amount corresponding to the portion B indicated by the shading.

The driving current (see FIG. 4) supplied from the driving circuit 8 to a stepping motor 7 also has an inclination at the rise and fall, making it possible to decrease the acceleration during rotation or stoppage of the step ping motor which is rotationally driven by such a driving current having an inclination. Meanwhile, it is generally known that the rotation of one micro step of a stepping motor is completed after an elapse of approximately 3 milliseconds from when the driving current is supplied. Therefore, in the present invention, a predetermined driving current C is supplied for a predetermined short time t (3 to 5 milliseconds) in one micro step interval T. Therefore, the time constant of the integration circuit 11 is set at approximately one fifth (0.6 milliseconds) of the time t so that the current control signals Sa' and Sb' turn on during the time t. Setting at such a time makes it possible to obtain the driving current up to a predetermined value.

After an elapse of this time t, a current c smaller than the driving current C is supplied. This is for the detent torque which becomes problematical when the stepping motor 7 is driven in micro steps. That is, if the current to the stepping motor 7 which is being driven in micro steps is shut off at the stoppage position, a force for positioning at a specific rotational angle determined by a constructional relationship between the rotor and the stator acts, causing the stoppage position to deviate. This force is the detent torque, and in order that the stepping motor 7 is held at the stoppage position, a torque which overcomes this detent torque must be generated. The current c smaller than the predetermined driving current C is a current for generating a torque which overcomes the detent torque. This current c is estimated to be approximately 10 percent of the driving current C.

Therefore, with the predetermined driving current C supplied for a predetermined time t and then a small current c supplied, a deviation from the predetermined stoppage position does not occur. Further, since the predetermined driving current C is supplied for only a short time t, the consumption of power reduces. As a result, heat generation in the driving circuit 8 and the stepping motor 7 reduces.

Further, since the rise and fall of the current control signals Sa' and Sb' are made to have an inclination, it is possible to decrease vibrations which occur when the stepping motor 7 is rotated. For this reason, vibrations of the head reduce, and track jumping does not occur.

As has been described up to this point, in the recording and reproduction apparatus of the present invention, since the driving current supply means supplies a driving current to a stepping motor for a predetermined time for each micro step, the consumption of power can be reduced, a switching element and the like which withstands a large current is not required for the driving circuit, and the apparatus can be constructed at a low cost. Further, since heat generation in the stepping motor and the driving circuit is reduced, a heat sink is not required. As a result, a small size of the apparatus can be achieved. Further, after an elapse of a predetermined time, since a current which is smaller than the driving current and which generates a torque larger than the detent torque of the stepping motor is supplied, a variation in the stoppage position due to the detent torque does not occur after the driving current is shut off.

Further, in the recording and reproduction apparatus of the present invention, since the driving current supply time is from 3 to 5 milliseconds, it is possible to drive the stepping motor in micro steps with a driving current in the minimum time, and the consumption of power can be reduced to a minimum.

Further, in the recording and reproduction apparatus of the present invention, since a control circuit for supplying a current control signal for controlling a driving current to driving current supply means is provided, and a current control signal is supplied to the driving current supply means via a low-pass filter, it is possible to reduce vibrations which occur when the stepping motor is rotated and therefore, the vibrations of the head reduce and track jumping does not occur.

Further, in the recording and reproduction apparatus of the present invention, since the low-pass filter comprises an integration circuit formed of a resistor and a capacitor and the time constant of the integration circuit is set at approximately one fifth of the driving current supply time, it is possible to supply a predetermined driving current for each micro step.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A recording and reproduction apparatus, comprising: a stepping motor for moving a head in a radial direction of a disk, and driving current supply means for supplying a driving current for driving said stepping motor in micro steps, wherein said driving current supply means supplies said driving current to said stepping motor for a predetermined time for each micro step, and supplies an electric current which is smaller than said driving current and which generates a torque larger than a detent torque of said stepping motor after an elapse of said predetermined time.

2. A recording and reproduction apparatus according to claim 1, wherein said predetermined time is from 3 to 5 milliseconds.

3. A recording and reproduction apparatus according to claim 1, wherein a control circuit for supplying a current control signal for controlling said driving current to said driving current supply means is provided so as to supply said current control signal to said driving current supply means via a low-pass filter.

4. A recording and reproduction apparatus according to claim 3, wherein said low-pass filter comprises an integration circuit formed of a resistor and a capacitor, and the time constant of said integration circuit is set at approximately one fifth of said predetermined time.

* * * * *

UNITED STATES PATENT AND TRADEMARK OFFICE
CERTIFICATE OF CORRECTION

PATENT NO. : 5,856,735
DATED : January 5, 1999
INVENTOR(S) : Mitsunori Sakashita It is certified that error appears in the above-identified patent and that said Letters Patent is hereby corrected as shown below:

On the title page,

After "[22] Filed Nov.19,1997", insert a new line as follows:

--[30] Foreign Application Priority Data Nov.20,1996 [JP] Japan...... 8-324537--.

Signed and Sealed this

Thirteenth Day of July, 1999

Attest:

Attesting Officer

Q. TODD DICKINSON

Acting Commissioner of Patents and Trademarks